United States Patent
Borgs et al.

(10) Patent No.: US 7,627,515 B2
(45) Date of Patent: Dec. 1, 2009

(54) PRICE DETERMINATION FOR ITEMS OF LOW DEMAND

(75) Inventors: Christian H. Borgs, Seattle, WA (US); Jennifer T. Chayes, Seattle, WA (US); David M. Chickering, Bellevue, WA (US); Uriel M. Feige, Bellevue, WA (US); Mohammad Mahdian, Bellevue, WA (US); Christopher A. Meek, Kirkland, WA (US); Amin Saberi, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 534 days.

(21) Appl. No.: 11/168,161

(22) Filed: Jun. 28, 2005

(65) Prior Publication Data

US 2006/0293995 A1 Dec. 28, 2006

(51) Int. Cl.
*G06Q 40/00* (2006.01)
(52) U.S. Cl. .................. 705/37; 705/26; 707/3
(58) Field of Classification Search .................. 705/37, 705/1, 14, 26, 27, 35, 39; 707/1, 3, 4, 10, 707/E17.108
See application file for complete search history.

(56) References Cited

U.S. PATENT DOCUMENTS

| 5,799,285 A | 8/1998 | Klingman |
| 6,272,473 B1 * | 8/2001 | Sandholm .................. 705/37 |
| 6,556,991 B1 | 4/2003 | Borkovsky |
| 6,834,272 B1 | 12/2004 | Naor et al. |
| 2003/0083892 A1 * | 5/2003 | Ramachandran et al. ....... 705/1 |
| 2003/0120662 A1 | 6/2003 | Vishik |
| 2004/0167845 A1 * | 8/2004 | Corn et al. .................. 705/37 |
| 2006/0136320 A1 * | 6/2006 | Saberi et al. .................. 705/37 |

OTHER PUBLICATIONS

Tagami, Kirsten "Losing Bidder Set Back in Atlanta Airport Marketing Dispute" Jun. 20, 2003, Atlanta Journal-Constitution.*
Anonymous "KFW'S WU4BN Dream Ticket DT Sale Ends in Nightmare" Oct. 15, 2004, Euroweek, N875,p. 1.*
Anonymous "Homeward bound: a relative newcomer to the travel-retail market outside Japan, Traveler Corp recently..."Oct. 15, 2002 Duty Free News International, p. 158.*
International Search Report for PCT Application No. US 06/ 25173 dated Sep. 5, 2007, 6 pgs.

* cited by examiner

*Primary Examiner*—Kelly Campen
(74) *Attorney, Agent, or Firm*—Lee & Hayes, PLLC

(57) ABSTRACT

A computer-implemented system that facilitates establishing price(s) associated with items comprises a clustering component that clusters a collection of non-identical items into one or more sets of non-identical items. A pricing component receives one or more of active bids and stored bids and simulates an auction of at least one non-identical item within one of the one or more sets of non-identical items as if the non-identical items within the set were identical to determine price(s) associated with the at least one non-identical item. For example, the items can be at least portions of search terms received by a search engine.

14 Claims, 15 Drawing Sheets

PRICE DETERMINATION FOR ITEMS OF LOW DEMAND

BACKGROUND

Advancements in networking and computing technologies have enabled transformation of computers from low performance/high cost devices capable of performing basic word processing and computing low-level mathematical computations to high performance/low cost machines capable of a myriad of disparate functions. For example, a consumer level computing device can be employed to aid a user in paying bills, tracking expenses, communicating nearly instantaneously with friends or family across large distances by way of email, obtaining information from networked data repositories, and numerous other functions/activities. Computers and peripherals associated therewith have thus become a staple in modern society, utilized for both personal and business activities.

The Internet in particular has provided users with a mechanism for obtaining information regarding any suitable subject matter. For example, various web sites are dedicated to posting text, images, and video relating to world, national, and/or local news. A user with knowledge of a Uniform Resource Locator (URL) associated with one of such web sites can simply enter the URL into a web browser to be provided with the web site and access content thereon. Another conventional manner of locating desired information from the Internet is through utilization of a search engine. For instance, a user can enter a word or series of words into a search field and thereafter initiate the search engine (e.g., through depression of a button, one or more keystrokes, voice commands, . . . ). The search engine then utilizes search algorithms to locate web sites related to the word or series of words entered by the user into the search field, and the user can then select one of the web sites returned by the search engine to review content therein.

As more and more people have begun to utilize the Internet, it has become apparent that revenue opportunities exist for small and large businesses alike. For instance, many retail companies utilize the Internet to sell goods online, thereby reducing costs associated with managing and maintaining a store location, providing an ability to centralize inventory, and various other similar benefits that result in decreased costs that are passed on to customers. Given this increased use of the Internet for generating business and/or revenue, it has also become apparent that the Internet can be utilized as an advertising mechanism. In one example, an individual who enters the term "flower" into a search engine may be interested in purchasing flowers—thus, it is beneficial for a company that sells flowers to advertise to that user at the point in time that the user is searching for the aforementioned term. Oftentimes users will see the advertisements and click on such advertisements to purchase flowers, thereby creating business for the flower retailer. Furthermore, the search engine is provided with additional revenue by selling advertisement space for a particular period of time to the flower retailer when the term "flower" is utilized as a search term.

Conventionally, advertising space relating to search terms provided to a search engine is bought or sold in an auction manner. More specifically, a search engine can receive a query (from a user) that includes one or more search terms that are of interest to a plurality of buyers. The buyers can place bids with respect to at least one of the search terms, and a buyer that corresponds to the highest bid will have their advertisement displayed upon a resulting page view. Bidding and selection of a bid can occur within a matter of milliseconds, thereby not adversely affecting usability of the search engine. Thus, two or more competing bidders can bid against one another within a limited time frame until a sale price of advertising space associated with one or more search terms in the received query is determined. This bidding is often accomplished by way of proxies (e.g., computer component) that are programmed with a demand curve for specific search term(s). As alluded to above, auctioning advertising space associated with search terms is a substantial source of revenue for search engines, and can further be a source of revenue for advertisers.

Auctioning of advertising space based upon received search terms works adequately with respect to terms that are associated with high demand and/or terms that are associated with a substantial amount of pricing data. For example, continuing with the above "flower" example, it can be assumed that the search term "flower" is a common search term and is associated with high demand (particularly during portions of the year proximate to certain holidays) with respect to advertisers wishing to display advertisements on a page view resulting from such term. More specifically, a number of bidders will be bidding against one another for advertising space on a resulting page view, thereby ensuring that the search engine will receive suitable revenue for such term.

The auction of space upon page views associated with search terms, however, is inadequate when the search terms are uncommon or are associated with low demand. For example, a single bidder can exist with respect to a search term associated with low demand (e.g., an uncommon search term), thereby enabling such bidder to purchase advertising space at an extremely low price. It is understood, however, that low frequency queries are not necessarily queries associated with low demand, as there may be a large number of bidders that may wish to advertise with respect to the queries (or terms therein). Similarly, high frequency queries are not necessarily queries associated with high demand, as there may be a small number of buyers interested in purchasing advertising space associated with high frequency queries. Due to the substantial number of searches that are conducted by way of search terms associated with low demand, a search engine can lose a significant amount of possible revenue. In an attempt to capture some of this possible revenue, search engines utilize reserve prices with respect to advertising space purchases. For a specific example, a search engine may set a reserve price of five cents for all advertising space thereon, and buyers can bid against such reserve price. If a bid exceeds the reserve price, the owner of such bid will have an advertisement displayed upon a resulting page view. If a bid does not exceed the reserve price, no advertisements are displayed upon a page view resulting from a received search query.

SUMMARY

The following presents a simplified summary of the claimed subject matter in order to provide a basic understanding of some aspects of such subject matter. This summary is not an extensive overview, and is not intended to identify key/critical elements of the claimed subject or to delineate the scope thereof. Its sole purpose is to present some concepts in a simplified form as a prelude to the more detailed description that is presented later.

The claimed subject matter relates generally to determining pricing information associated with low-demand items and/or items that are associated with insufficient pricing data. For instance, the pricing information can be a dynamically determined reserve price. In one example, a collection of items associated with low demand is received and clustered into one or more sets of items, wherein items within the sets of items are in some way related but non-identical. For instance, the items can be search terms, wherein advertisers can provide bids with respect to the search terms to purchase advertising space on a page view resulting from utilization of the search terms. Thus, a set of search terms can include a plurality of related but non-identical search terms. Furthermore, any suitable clustering algorithm(s) and/or clustering strategies can be employed when generating the sets of items. There should be, however, a sufficient number of items within a set so that a suitable number of bids can be received with respect to items within the set.

In another example, when an item in a set is available for auction, a simulated auction can proceed with respect to all items within the set. In other words, even though other items within the set are not available for auction, bids with respect to such items can be received. More particularly, items within a set can be treated as though they were a single item when one item within the set becomes available for auction. For example, a search engine can receive a search term, wherein such search term is associated with low demand and is existent within a set of search terms. One or more prospective purchasers can bid upon the search term in order to purchase advertising space upon a page view resulting from utilization of the search term. Conventionally, reserve prices are set with respect to an entire system. For instance, in the context of search terms, a search engine can set a same reserve price for every search term that becomes available. As described above, however, utilizing such "one size fits all" approach does not capture a significant amount of potential revenue. The claimed subject matter addresses such deficiency by clustering non-identical items and causing bidders to bid against one another, even though such bidders are not bidding on a same item. For example, the clustering can be a random clustering and/or can be utilized to cluster related but non-identical items.

Reserve price(s) can be dynamically determined for items at auction based at least in part upon received bids relating to disparate items. For instance, the price can be set so that a defined fraction of bids lies above such price. In another example, the price can be set so that a threshold number of bidders have bid above the set price. Thus, it can be discerned that any suitable manner for setting a dynamically determined reserve price can be undertaken without deviating from the scope of the claimed subject matter. Upon dynamically setting the reserve price, one or more bids for the item at auction can be analyzed. If there is a single bidder, and such bidder bids above the set price, then the bid request is served (e.g., the bidder has successfully purchased the item). If there is a single bidder and such bidder bids below the set price, then the bid request is not served. If two bidders exist that bid above the set price, then a conventional auction can ensue (e.g., the item goes to the highest bidder). In still another example, bids can be collected and stored over a period of time—thus, bids for non-identical items within a set that occurred at a prior point in time can be treated as if they were received for an item available at auction.

Furthermore, a determined price with respect to a set of items can be monitored over time and altered. For example, the set of items can be subject to changes in demand given particular times of day, days of week, time of year, and the like. Such alterations in demand can be monitored, and pricing information for the set of items can be modified in accordance therewith.

To the accomplishment of the foregoing and related ends, certain illustrative aspects of the claimed subject matter are described herein in connection with the following description and the annexed drawings. These aspects are indicative, however, of but a few of the various ways in which the principles of the invention may be employed and the subject matter recited in the claims is intended to include all such aspects and their equivalents. Other advantages and novel features may become apparent from the following detailed description when considered in conjunction with the drawings.

DETAILED DESCRIPTION

Figure 1:
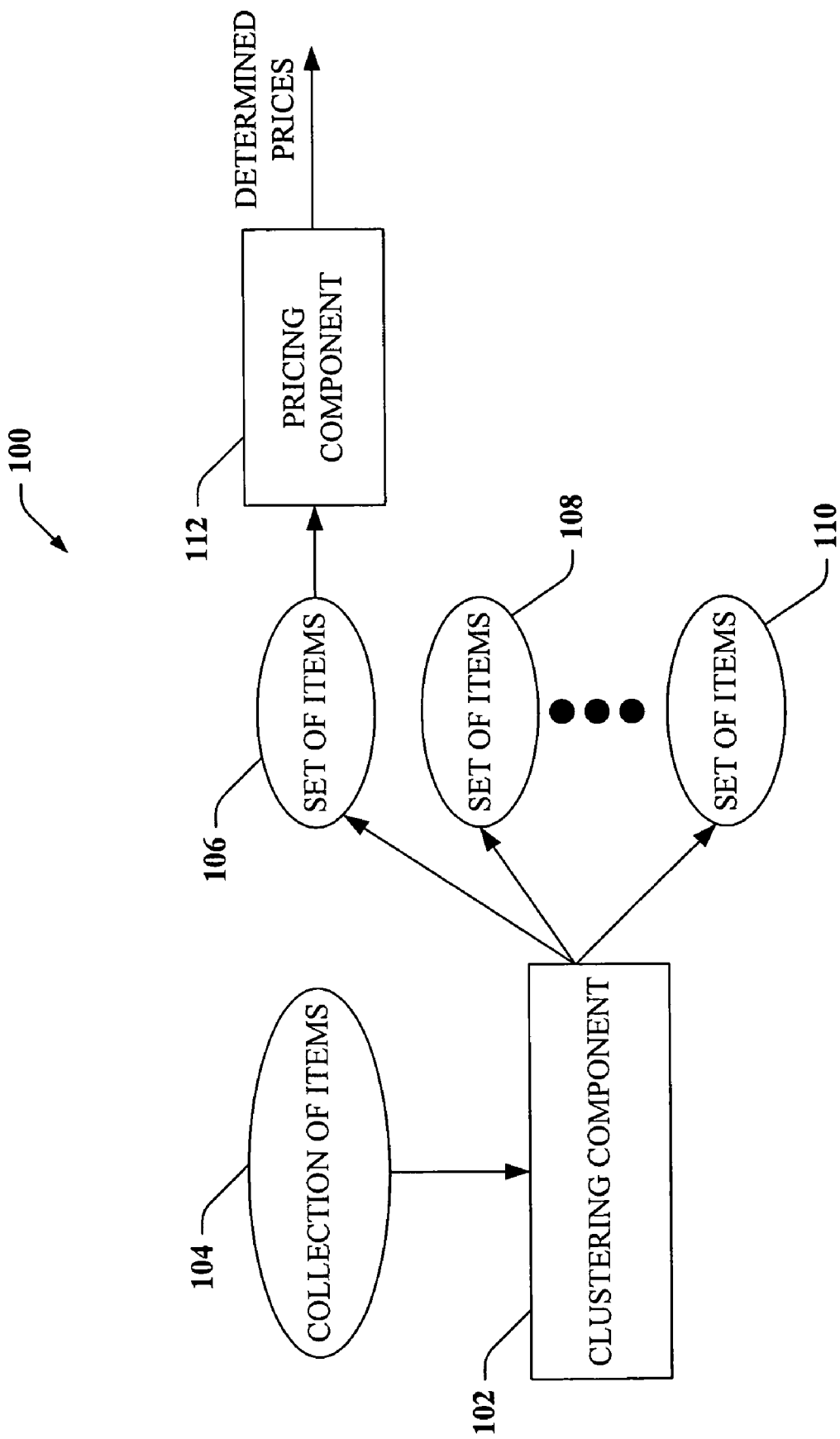
FIG. 1 is a high-level block diagram of a system that facilitates determining pricing information associated with a set of related but non-identical items.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject matter as recited in the claims.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Furthermore, the claimed subject matter may be implemented as a method, apparatus, or article of manufacture using standard programming and/or engineering techniques to produce software, firmware, hardware, or any combination thereof to control a computer to implement features disclosed herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

The claimed subject matter will now be described with respect to the drawings, where like numerals represent like elements throughout. The subject invention generally relates to novel systems, methods, articles of manufacture, and/or apparatuses that facilitate determining prices for sets of non-identical, low demand items. For instance, the items can be advertising space that appears on a page view associated with a particular search term, wherein a page view is a particular page viewed by a particular user—thus each loaded page can be considered a page view. It is understood, however, that aspects of the claimed subject matter can be applied with respect to any suitable item, and that such aspects are not limited to utilization with respect to sale of advertising space associated with a search engine. Referring now to FIG. 1, a system 100 that facilitates determining pricing information with respect to a group of items is illustrated. The system 100 includes a clustering component 102 that receives a collection of items 104 and clusters such collection of items 104 into one or more sets of items 106-110. For instance, the collection of items 104 can include automobiles, and the clustering component 102 can cluster the automobiles in any suitable manner. For example, the set of items 106 can include luxury automobiles, the set of items 108 can include economy automobiles, the set 110 can include performance automobiles, etc. Thus, each of the sets of items 106-110 can include similar but non-identical items. In another example, the sets of items 106-110 can include randomly clustered items.

In another example, the collection of items 104 can include search terms utilized in connection with a search engine for locating content on a network, such as the Internet. The term "search terms" is intended to include a word, a phrase, a search query, a particular portion of a search query (e.g., a prefix comprising a threshold number of words or spaces, a suffix comprising a threshold number of words or spaces, . . . ). For example, the search terms within the collection of items 104 can be associated with sparse usage, little to no data, and/or relatively low demand with respect to advertising. As such, conventionally it has been difficult to determine a suitable price for which to sell advertising space associated with search terms of low demand. The clustering component 102 can thereafter generate the sets of items 106-110 by way of any suitable clustering algorithm(s). The type of clustering and level of granularity of clustering can be optimized by way of experimentation, for example. The sets of items 106-110 can be created so that, in an auction setting, a reasonable number bids will be received with respect to items within the sets of items 106-110. In more detail, while each item individually within one of the sets of items 106-110 may not receive a substantial number of bids, collectively items within each of the sets of items 106-110 can receive a reasonable number of bids.

The system 100 further includes a pricing component 112 that analyzes at least the set of items 106 and determines a price in which to sell each of the items within the set of items 106. For example, the pricing component 112 can simulate an auction amongst the items within the set of items 106 by acting as if each of the items within the set of items 106 were identical, utilizing actual bids for each of those items. For example, a first bidder can bid on a first item within the set of items 106, and a second bidder can bid on a second item within the set of items 106, yet the bids are treated as if they are on the same item (e.g., the first and second bidders are bidding against one another). Accordingly, the pricing component 112 can set a price for each of the items within the set of items 106. For instance, each item within the set of items 106 can be associated with a substantially similar price. Thereafter, such auctioning can be utilized to determine a reserve price for each of the items within the set of items 106. For example, when an item within the set of items 106 is available for auction, a price can be set such that a threshold number and/or fraction of bidders relating to the set of items 106 bid above such price. If a single bid is received for the item and an amount of the bid is above the set price, then the owner of the bid can receive the item. In contrast, if a single bid is received for the item and an amount of the bid is below the set price, the owner of the bid may not be provided with the item. If two or more bids are received for a substantially similar item and both bids are above the set price, a conventional auction can take place (e.g., the highest bidder receives the item). It can be noted that the set price is determined at a time that bids are received—thus the set price can differentiate from a reserve price (e.g., it is determined dynamically). A price determined with respect to the set of items 106 can be utilized as a price for the set of items 108. Furthermore, a filtering mechanism can be employed in connection with each of the sets of items 106-110 to remove high-volume/high demand items from such sets (and from the collection of items 104).

To more fully explain the claimed subject matter, an exemplary implementation is provided. The collection of items 104 can be advertising space associated with particular search terms, wherein the search terms are uncommon and/or associated with low demand with respect to advertising. Thus, when wishing to advertise upon a page view relating to a search term, an advertiser can monitor a search engine and enter bids upon particular search terms. Accordingly, the collection of items 104 can also be referred to as a collection of search terms. The clustering component 102 can cluster the search terms into a plurality of sets of items 106-110, wherein the search terms within the sets of items 106-110 are associated with little data and/or low demand. A search engine can receive a search term within the set of items 106, and the pricing component 112 can simulate an auction amongst the items within the set of items 106 based upon actual received bids.

At least a portion of the received bids, for example, can be active bids with respect to search terms within the set of items 106. In more detail, prospective purchasers of items within the set of items 106 may believe that all search terms within the set of items 106 have been received, and advertising space associated with the search terms is available. Thus, again, the bids can be active with respect to search terms within the set of items 106. In another example, at least a portion of the received bids can relate to prior (inactive) bids that have been stored for later utilization. Thus, any suitable combination of active bids and prior bids can be utilized in connection with an auction simulated by way of the pricing component 112.

Upon undertaking the simulate auction, in one example, a price for the search term can be set in such a way that a threshold number and/or fraction of bidders is above such price, and if the bidder for the search term has provided a bid that is above the set price an advertisement associated with the bidder will be displayed upon a resulting page view. If the bid is not above the set price, the advertising space will not be sold. Thus, if desired, the threshold number and/or fraction of bidders can be set in such a manner to ensure that a bidder with respect to the at-issue search term is the highest bidder. It can easily be discerned, however, that the threshold can be set at any suitable level (e.g., a level that is found to maximize revenue over a particular period of time). Furthermore, it is understood that the system 100 can reside upon a server, a client, a portable computing device such as a cellular telephone, a personal digital assistant, and the like, or any other suitable computing device.

Figure 2:
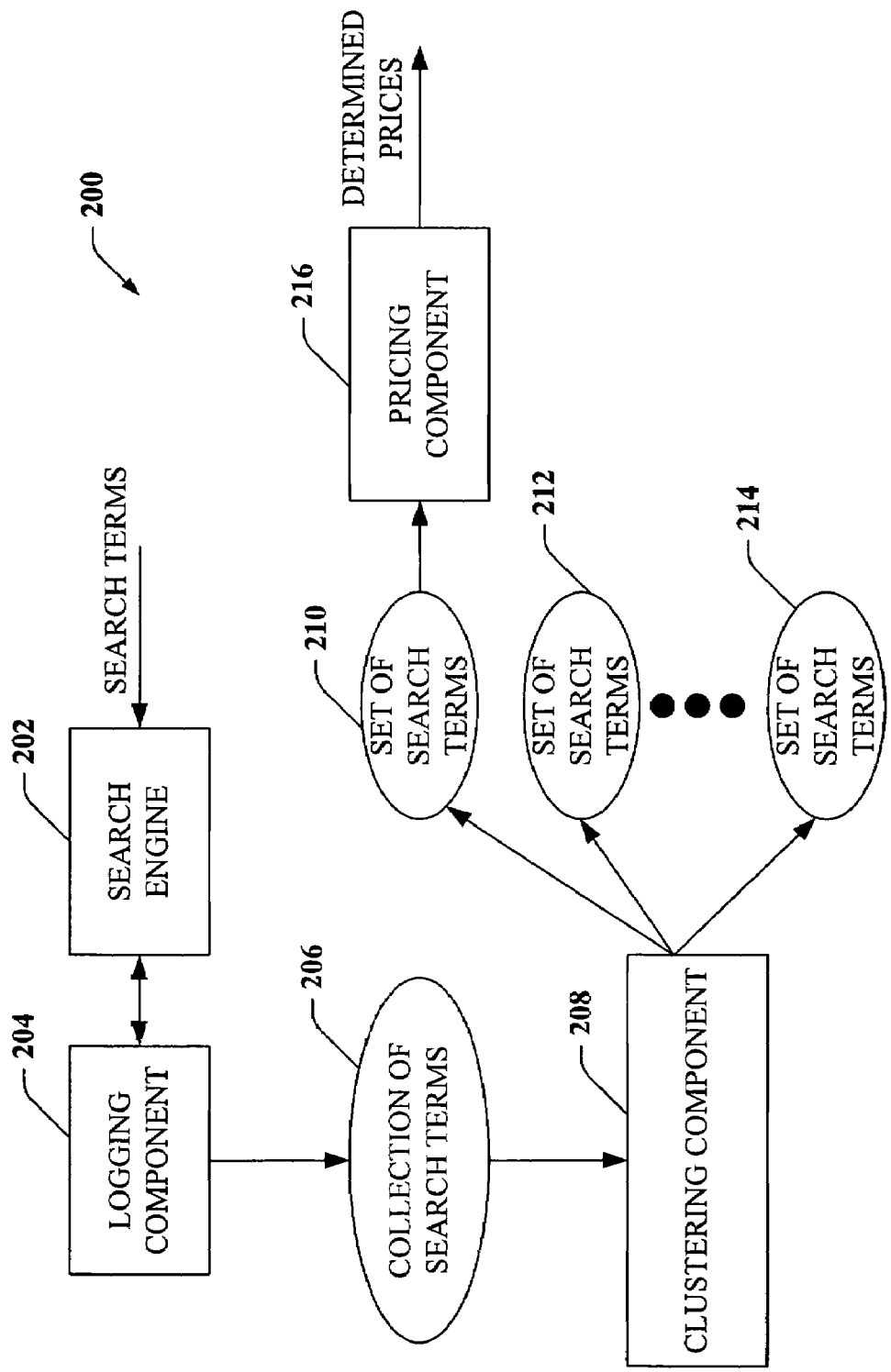
FIG. 2 is a block diagram of a system that facilitates determining pricing information associated with a plurality of low-demand search terms.

Now turning to FIG. 2, a system 200 that facilitates determining a price by which to sell advertising space associated with search terms is illustrated. For instance, the determined price can be a reserve price—that is, a minimum amount that a prospective purchaser of an advertising space can bid in order to have an advertisement shown upon a page view. The system 200 includes a search engine 202 that receives one or more search terms, wherein such search terms are typically provided by a user searching for content relating to the provided terms. For instance, if a user wished to find information on a tulip, the user could enter the search term "tulip" into the search engine 202. The search engine 202 can be associated with a logging component 204 that logs search terms entered by users and places such search terms into a collection of search terms 206. Thus, the collection of search terms 206 can include a substantial number of search terms, wherein many of such terms may be associated with relatively little data with respect to advertising (e.g., little or no data regarding a purchase price for advertising space relating to the search terms). Further, the collection of search terms 206 can be collected over a particular period of time. Similarly, search terms can be removed from the collection of search terms 206 after a defined period of time, thus keeping the collection of search terms 206 current. The amount of time can be obtained through optimization by way of machine learning, experiment, and the like. Moreover, while not shown, a filter can be employed in connection with the collection of search terms 206 to remove high frequency and/or high demand search terms from the collection of search terms 206. As described above, determining whether a search term is of low or high demand can be accomplished through optimization by way of machine learning, experimentation, etc.

A clustering component 208 receives the collection of search terms 206 and creates one or more sets of search terms 210-214 (that are subsets of the collection of search terms 206). A number of search terms within each of the sets of search terms 210-214 can be set in such a manner that a reasonable number of searches utilizing such search terms will occur within a defined period of time (and a reasonable number of bids for advertising space associated with the search terms will be received). Furthermore, the clustering component 208 can employ any suitable clustering algorithm(s) and/or strategies in connection with generating the sets of search terms 210-214. For example, the clustering can be semantic clustering determined by (previous) user search behavior.

Once the search engine 202 receives a search term within one of the sets of search terms (e.g., the set of search terms 210), a pricing component 216 can accept bids for advertising space associated with the search term as well as accept bids for advertising space associated with search terms within the set of search terms 210 (even though such terms have not been searched). Thus, the pricing component 216 will treat each of the search terms within the set of search terms 210 as the same when receiving bids. To determine a sale price for the at-issue search term, the pricing component 216 can analyze each of the bids received and set the price at a level that a defined fraction or number of buyers bid over. In another example, the pricing component 216 can select a mean price based upon received bids. Thus it is understood that any suitable manner for setting price based at least in part upon an amounts associated with received bids is contemplated by the inventors and intended to fall under the scope of the hereto-appended claims.

Figure 3:
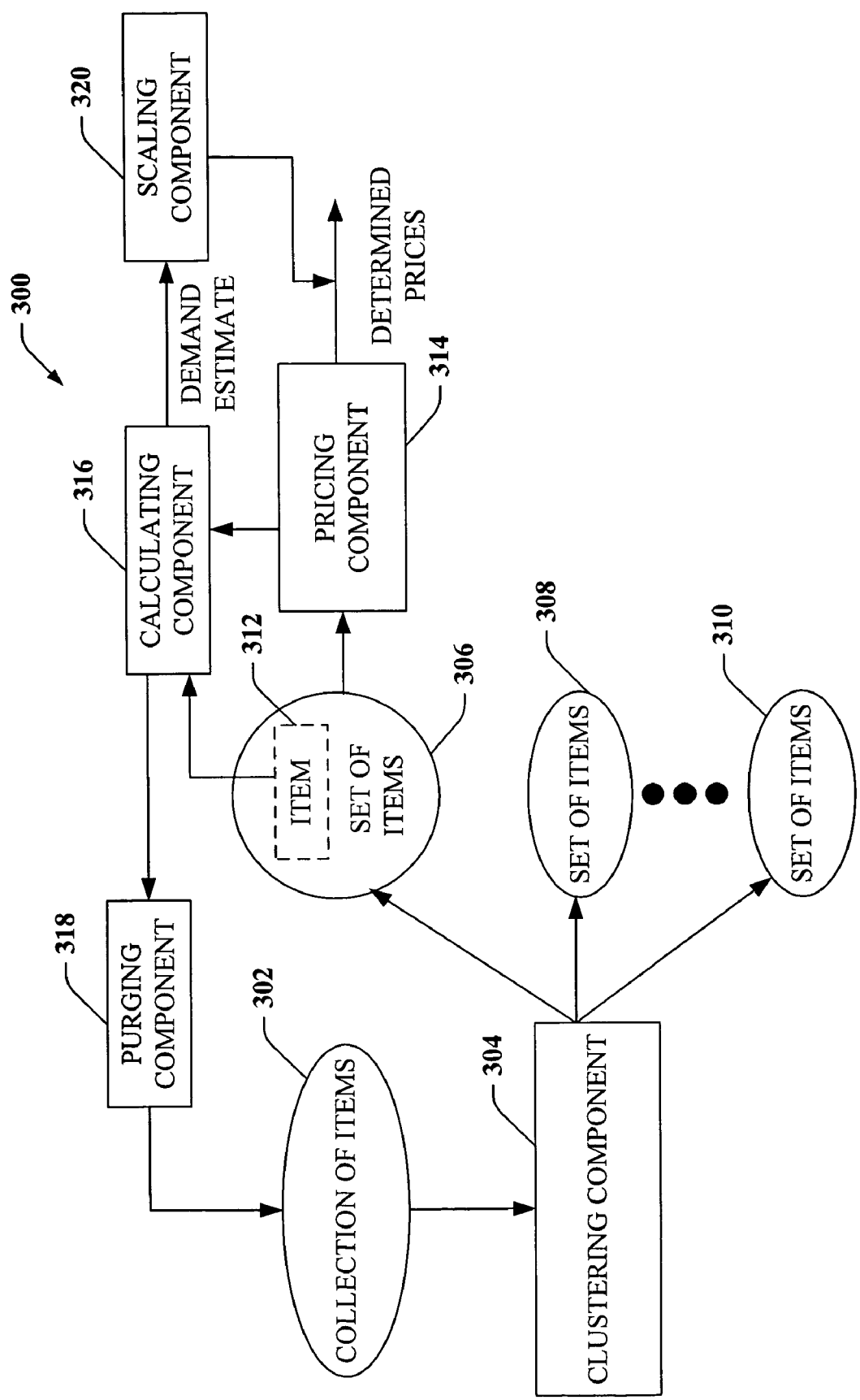
FIG. 3 is a block diagram of a system that facilitates estimating demand associated with an item and purging the item if such item is associated with a demand above a defined threshold.

Referring now to FIG. 3, a system 300 that facilitates determining pricing information with respect to one or more items associated with low demand and/or little data. The system 300 includes a collection of items 302, such as search terms that can be utilized in connection with a search engine, wherein individual items within the collection of items 302 are associated with low demand and/or little data (e.g., with respect to pricing of the items). A clustering component 304 receives the collection of items 302 and generates sets of items 306-310 by way of any suitable clustering algorithm or algorithms.

For example, the set of items 306 can include an item 312 that is subject to auction (e.g., a search term received by a search engine). A pricing component 314 can accept bids for the item 312 as well as for other similar but non-identical items within the set of items 306. In more detail, as described above, the pricing component 314 can receive bids for disparate items within the set of items 306 but act as if all such bids are for a single item (e.g., a received search term). The pricing component 314 can determine a dynamic reserve price by analyzing the received bids with respect to other items within the set of items 306 and generating a price based at least in part upon the analysis. For instance, a price can be selected such that a desired percentage of bidders bid above the selected price. Other manners of selecting a dynamic reserve price based at least in part upon the received bids, however, are also contemplated.

To aid in determining of price of the at-issue item 312, a calculating component 316 can generate an estimate of demand associated with the item 312. For instance, a data store (not shown) can include purchasing activity with respect to the item 312 and other similar items. The calculating component 316 can analyze such data and generate an estimate of demand associated with such item 312. A purging component 318 can be communicatively coupled to the calculating component 316 and can purge the item 312 from the collection of items 302 if the estimated demand lies above a threshold. Thereafter, the item 312 can be subject to a conventional auction (rather than subject to the pricing component 314), as the system 300 is designed to determine prices for items associated with low demand.

Furthermore, the pricing component 316 can be associated with a scaling component 320 that can scale a determined price in accordance with an estimated demand. For example, the calculating component 316 can determine that an estimated demand for the item 312 is comparatively greater than an estimated demand for other items within the set of items 310, but not sufficient to purge the item 312 from the set of items 306 (and the collection of items 302). Accordingly, however, the price of the item 312 should be greater than bids received for other items within the set of items 306. Thus, the scaling component 320 can scale the determined price output by the pricing component 314 in accordance with the estimated demand generated by the calculating component 316. In a simplistic example, three disparate automobiles can be classified as luxury automobiles; however, there may be a much greater demand for one of the three. Thus, bids received for the two automobiles associated with lower demand can still be utilized to determine a reserve price for the automobile associated with the high demand, as the bids and/or price computed from such bids can be scaled by the scaling component 320.

Figure 4:
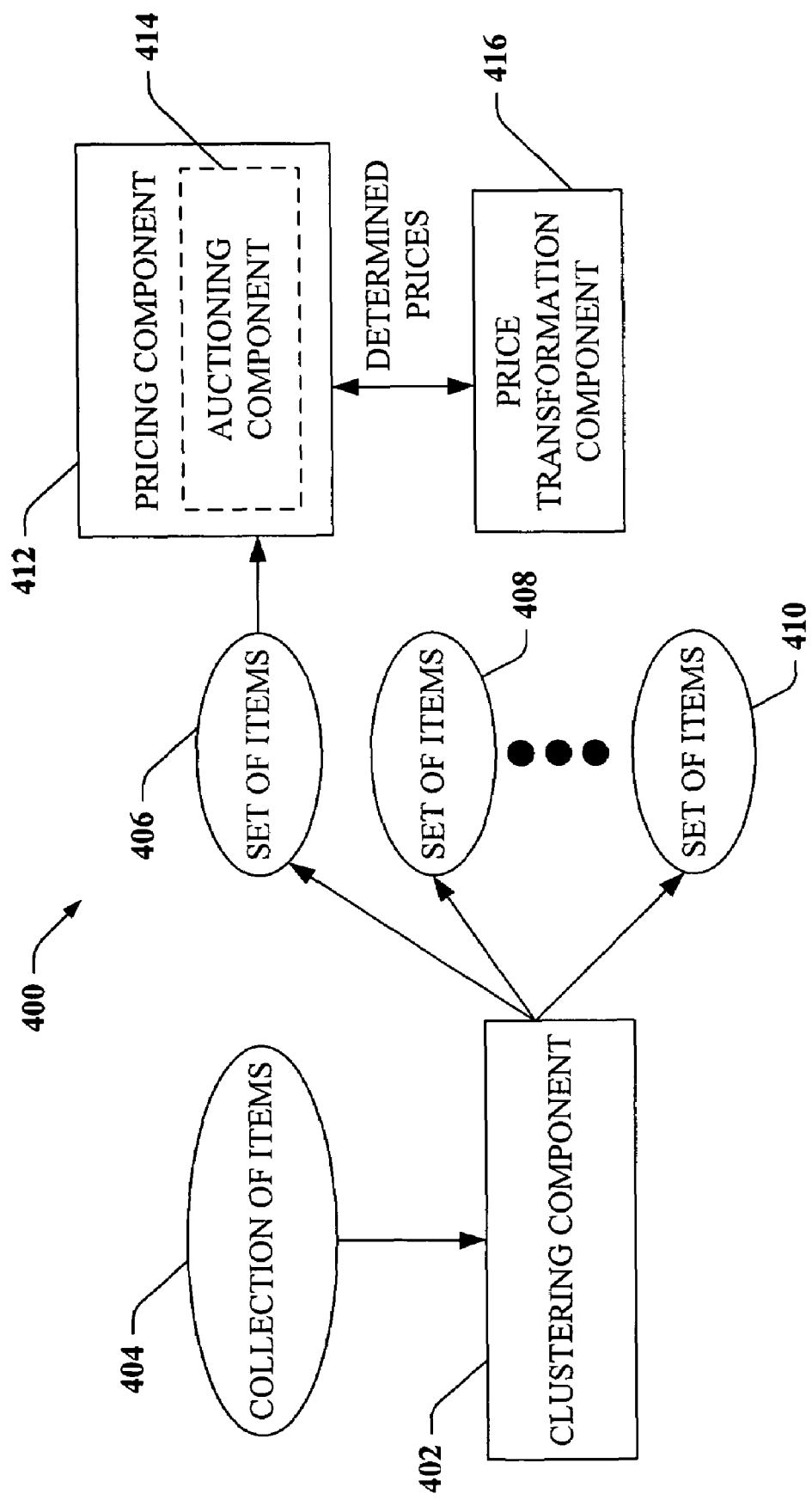
FIG. 4 is a block diagram of a system that facilitates conversion of sale parameters.

Now referring to FIG. 4, a system 400 that facilitates dynamically determining a reserve price for items of low demand is illustrated. The system 400 includes a clustering component 402 that receives a collection of items 404, wherein items therein are associated with low demand and/or insufficient pricing data (e.g., historical data relating to purchase price of the items). For instance, the items within the collection of items 404 can be search terms, and bids can be made for advertising space associated with page views resulting from the search terms. Thus, when referred as bidding on search terms, it is understood that in actuality bids are received with respect to advertising space resulting from utilization of a search term within a search engine. The clustering component 402 can cluster items within the collection of items 404 into one or more sets of items 406-410, so that each of the sets of items 406-410 includes related but non-identical items.

Upon making one of the items within the collection of items available for auction, a pricing component can solicit/receive bids for the item as well as bids for other items within a set that includes the item for sale. For instance, the set of items 406 can include an item for sale, and the pricing component 412 can solicit/receive bids for the item and other items within the set of items 406. In other words, the pricing component 406 can treat each of the items within the set of items 406 as the same item with respect to receipt of bids. In a more specific example, a search engine that sells spaces on page views for advertising purposes can receive a search term, and one or more advertisers can bid for advertising space associated with such term. The search term can be associated with low demand, and thus be included within the collection of items 404 and exist within the set of items 406 (which includes related but non-identical search terms). The pricing component 412 can then receive bids with respect to the search term as well as with respect to other search terms within the set of items 406.

An auctioning component 414 can analyze such bids and/or cause competitive bidding to occur. For instance, the auctioning component 414 can receive a first bid from a first bidder and a second bid from a second bidder that exceeds the first bid. The auctioning component 414 can then provide the first bidder with an opportunity to exceed the second bid. Further, it is understood that the bids can relate to any of the items within the set of items 406—accordingly, bidders may be bidding against one another for separate items. Continuing the above search term example, prospective purchasers can be made to believe that several items (e.g., items within the set of items 406) are available for purchase by way of auction. The prospective purchasers can then submit bids for items within the set of items, by way of, for example, proxies programmed with demand curves. The bids for the disparate items within the set of items can thereafter be utilized to dynamically determine a reserve price for an item that is actually available for purchase. Bids relating to items within the set of items 406 can be collected and utilized in dynamically determining a price for the at-issue item.

The system 400 can further include a price transformation component 416 that can convert a determined price into a price preferred by a prospective purchaser. The price transformation component 416 can further convert a bid from a prospective purchaser in one format to a disparate format. For example, with respect to advertising on a page view, a purchaser may wish to purchase/pay for advertising space based upon clicks received by the advertisement. More particularly, the purchaser may not wish to pay if the advertisement is not subject to a click. Therefore, the purchaser may provide a bid that relates to a click (rather than a bid relating to an impression). Similarly, the purchaser may provide a bid that relates to a secured click, a purchase resulting from the advertisement, and the like, while the pricing component 412 generates prices in a different format (e.g., impressions). The price transformation component 416 can employ conversion tables to convert a bid from one format to a disparate format, and can further convert pricing information from one format to a format desired by a purchaser.

Figure 5:
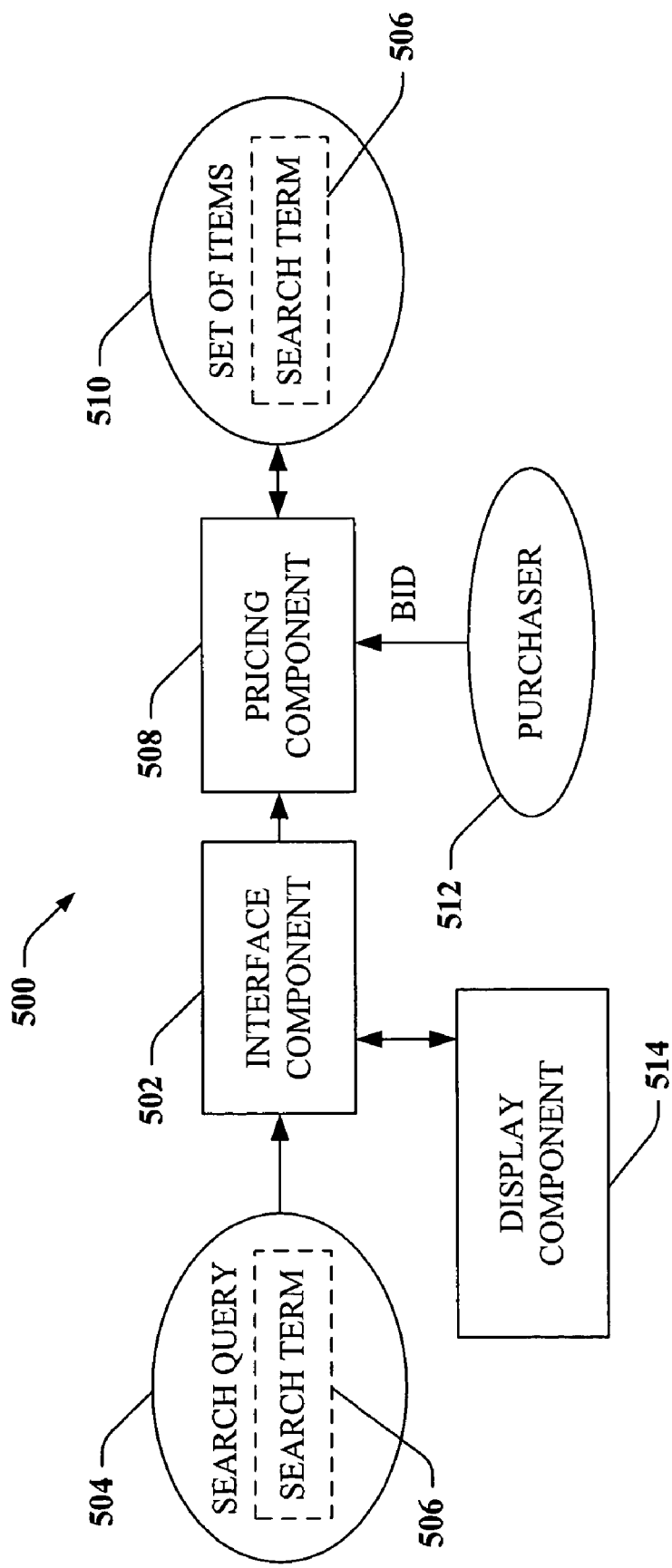
FIG. 5 is a block diagram of a system that facilitates displaying an advertisement associated with a search term if a bid for the search term exceeds a dynamically determined reserve price.

Now turning to FIG. 5, a system 500 that facilitates auctioning a search term is illustrated. The system 500 includes an interface component 502 associated with a search engine (not shown) that receives a search query 504, wherein the search query comprises at least one search term. For example, the search term 506 can be an entirety of the search query 504, a word, a phrase, a portion of a phrase, a suffix of a search query, a prefix of a search query, or any other suitable portion of a search query. The interface component 502 can be a graphical user interface, a keyboard, voice recognition hardware and/or software, a microphone, a mouse, or any other suitable interface that enables creation/receipt of the search query 504.

The search term 506 can then be delivered to a pricing component 508 (which can operate in a manner described with respect to FIGS. 1-4). More particularly, the pricing component 508 can dynamically determine a reserve price associated with the search term 506. More particularly, the pricing component 508 can accept and/or analyze bids relating to the search term 506 as well as other search terms within a set of items 510 from a purchaser 512. Thus, the pricing component 508 can dynamically determine a reserve price associated with the search term 506 by simulating an auction amongst all search terms within the set of items 510 (e.g., the search terms within the set of items 510 are treated as identical).

If the purchaser 512 submits a bid that is greater than a price determined by the pricing component 508, then an advertisement associated with the purchaser 512 can be displayed upon a page view resulting from utilization of the search term 506. A display component 514 can be employed to display an advertisement associated with the purchaser 512 as well as search results relating to the search term 506. The display component 514 can, for instance, include a computer screen or other similar screen, speakers for audible presentation of search results and/or advertisements, etc. If the purchaser 512 does not provide a bid that is above the determined price, then the display component 514 will not display an advertisement associated with the purchaser 512.

Figure 6:
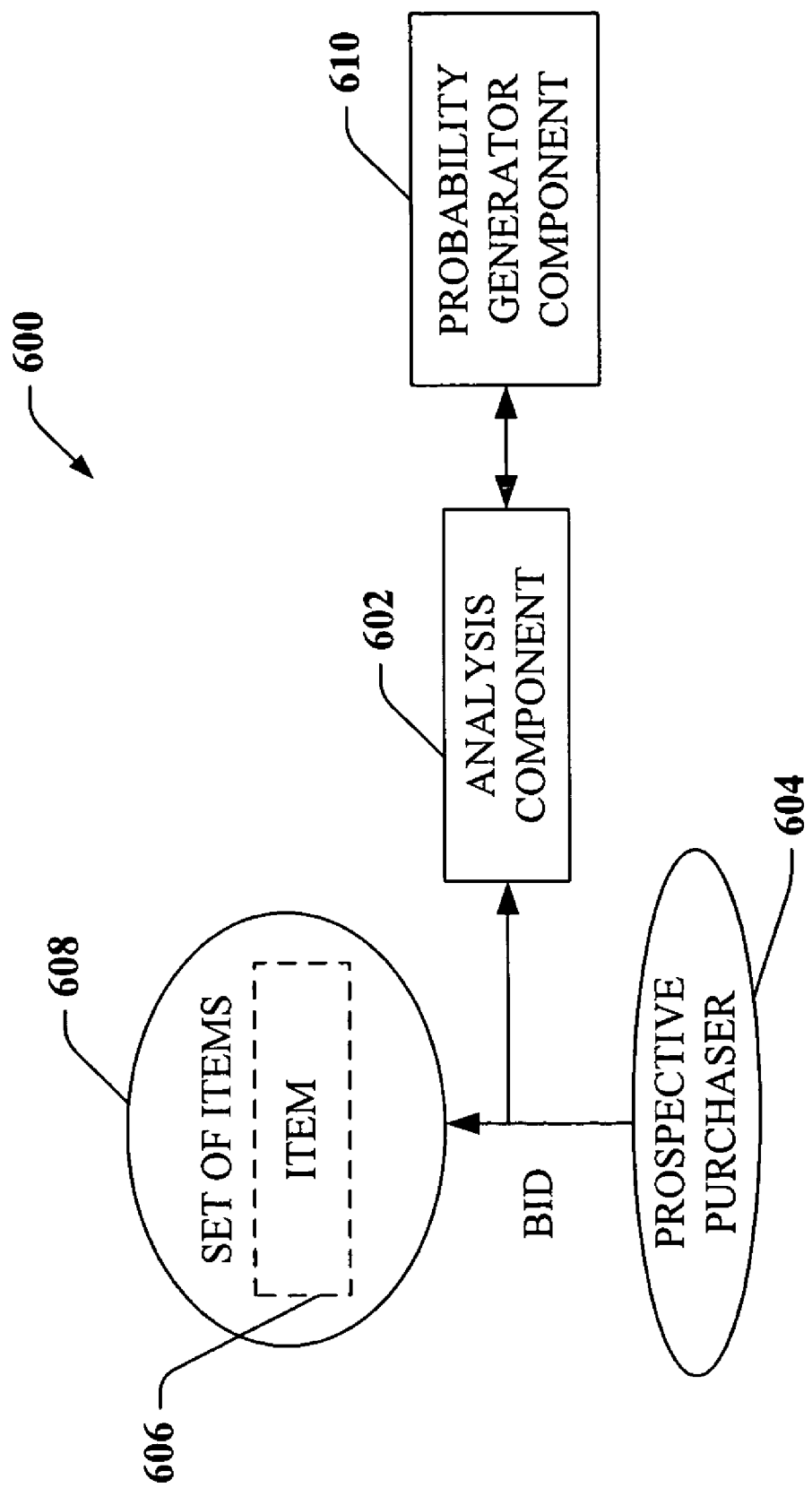
FIG. 6 is a block diagram of a system that facilitates dismissing a bid associated with a prospective buyer if a probability that the buyer is acting adversely to the free market is above a threshold.

Now referring to FIG. 6, a system 600 that facilitates determining pricing information associated with items of low demand is illustrated. The system 600 includes an analysis component 602 that monitors bidding activity of a prospective purchaser with respect to at least an item 606 within a set of items 608. It is understood, however, that the analysis component 602 can monitor any bidding activity undertaken by the prospective purchaser 604. Data obtained by the analysis component 602 can then be relayed to a probability generator component 610, which can generate a probability that the prospective purchaser 604 is bidding in a manner to adversely affect the free market. For instance, pricing can be manipulated through collusion of purchasers. More particularly, advertisers can collude to bid below market value, thereby causing pricing information determined by a pricing component (FIG. 1) to below market value. Similarly, advertisers can collude to bid well above market value, thereby raising prices above market value and potentially harming a competitor. Accordingly, the analysis component 602 can monitor bidding activity of the prospective purchaser 604 over time, and deliver such data to the probability generator component 610.

The probability generator 610 can then analyze such data and make a probabilistic determination regarding whether the prospective purchaser is bidding in a manner adverse to a free market. If the calculated probability is above a threshold, the bid provided by the prospective purchaser 604 can be disregarded. In contrast, if the probability is below a threshold, the bid provided by the prospective purchaser 604 can be accepted and utilized to determine pricing information relating to the item 606.

Figure 7:
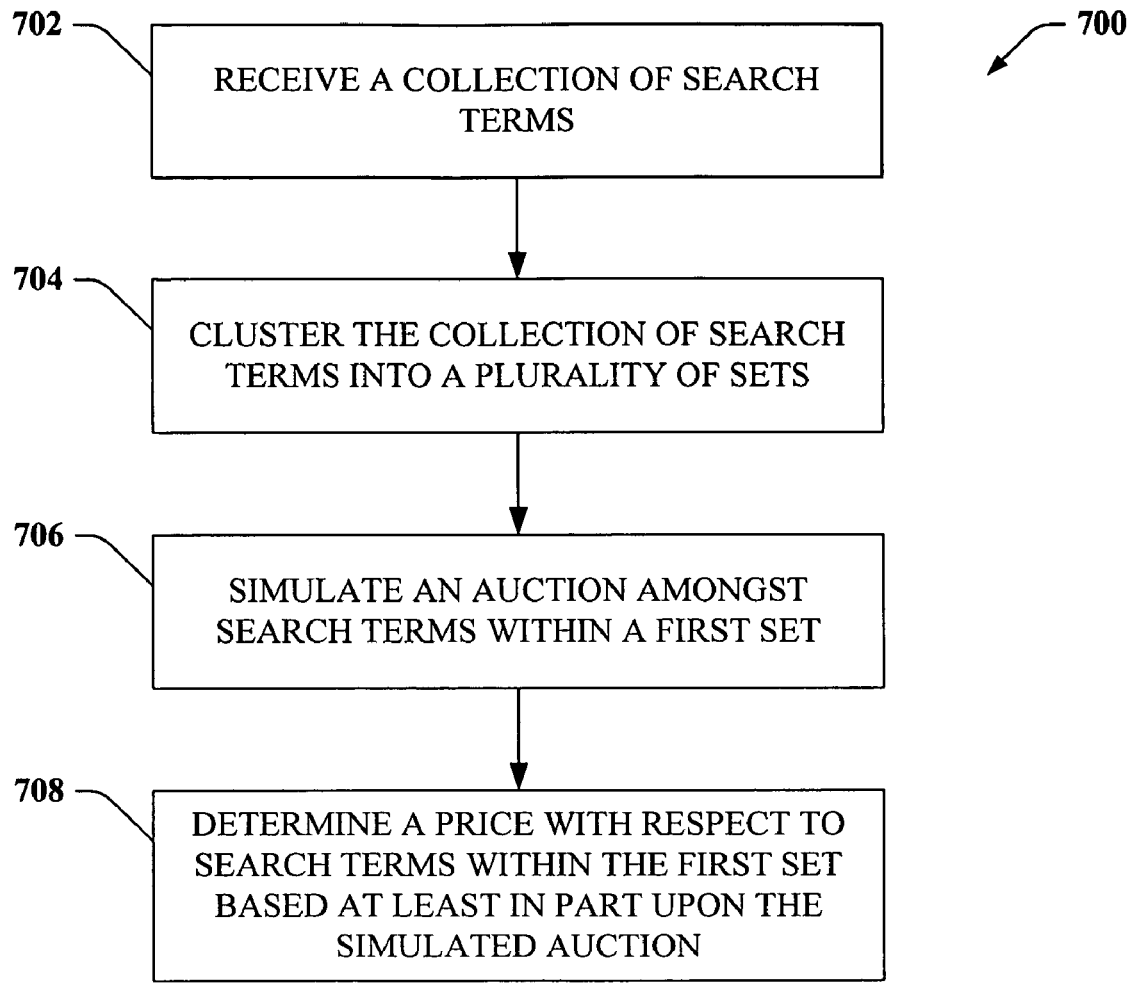
FIG. 7 is a representative flow diagram illustrating a methodology for dynamically determining a reserve price with respect to a low-demand item.
Figure 8:
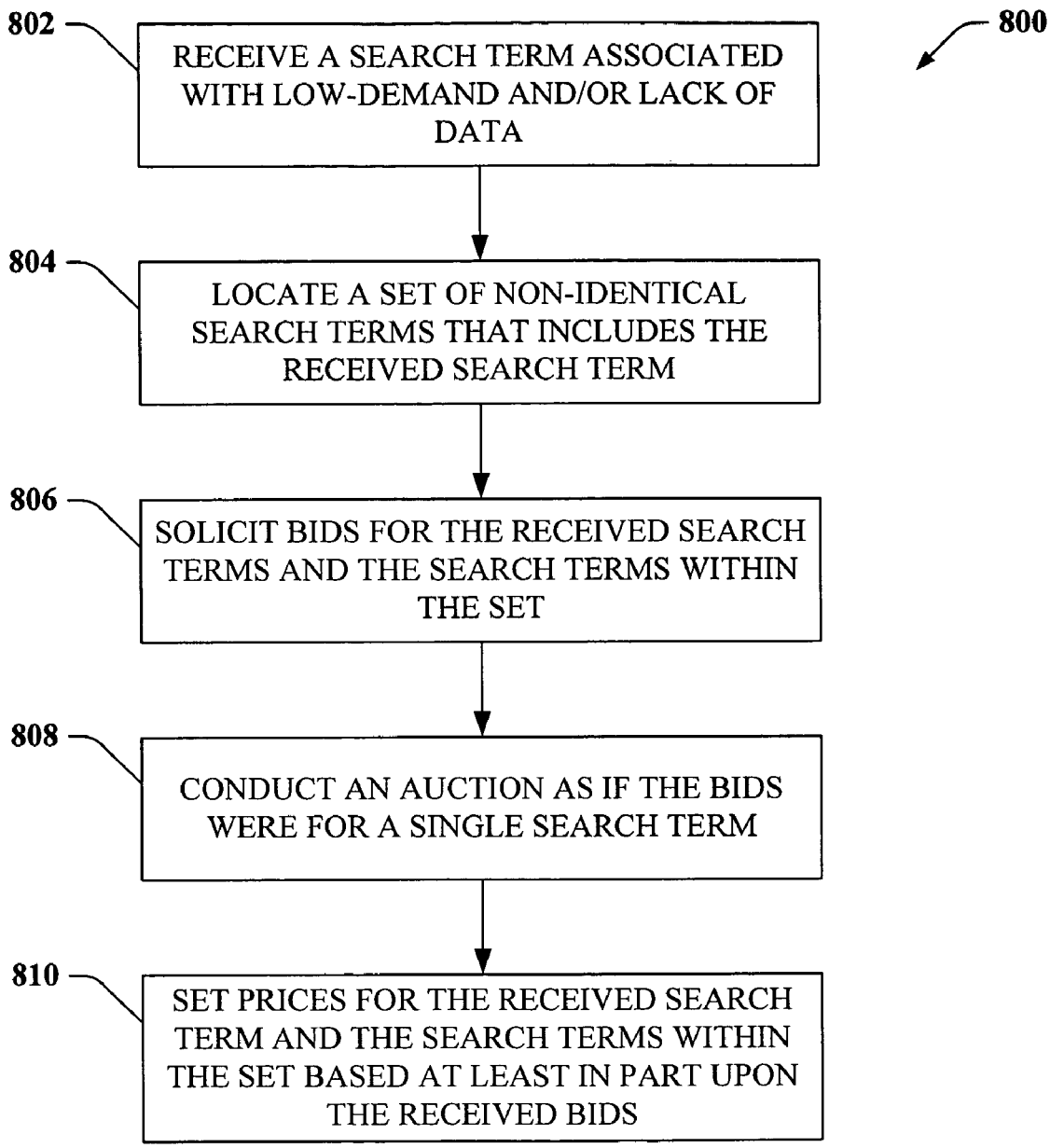
FIG. 8 is a representative flow diagram illustrating a methodology for dynamically setting reserve prices with respect to low demand search terms.
Figure 9:
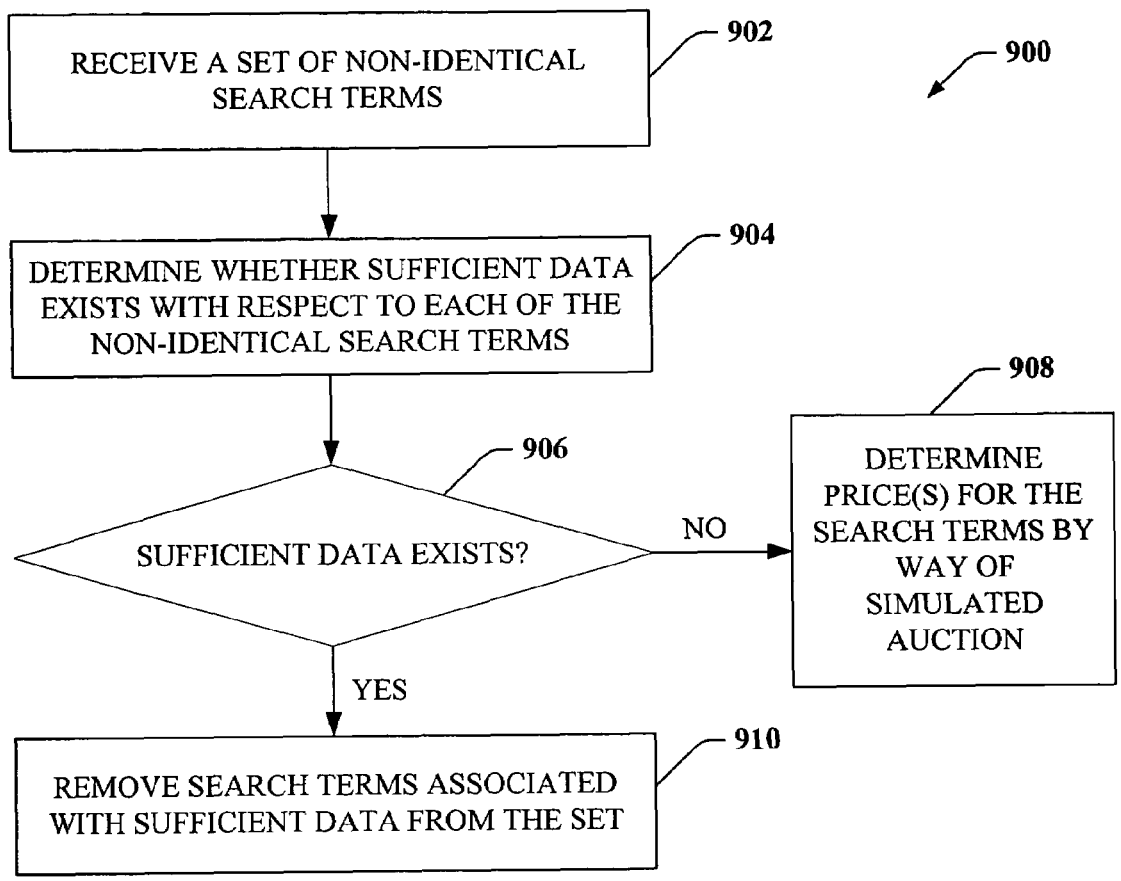
FIG. 9 is a representative flow diagram illustrating a methodology for determining a manner by which to sell advertising space associated with a search term.

Referring now to FIGS. 7-9, methodologies in accordance with the claimed subject matter will now be described by way of a series of acts. It is to be understood and appreciated that the following description is not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning solely to FIG. 7, a methodology 700 for determining pricing information associated with low demand items is illustrated. At 702, a collection of search terms is received. For example, the collection of search terms can be created by way of a logging component associated with a search engine, which logs search terms provided to the search engine. Furthermore, the search terms within the collection of search terms can be associated with low demand and/or insufficient data. At 704, the collection of search terms is subjected to clustering algorithm(s), which can cluster the collection of search terms into a plurality of disparate sets of search terms. Any suitable clustering algorithm(s)/strategies can be utilized to generate the sets of search terms. The plurality of sets of search terms can each include non-identical but related search terms.

At 706, an auction is simulated amongst the search terms within a first set of search terms. In more detail, advertising space with respect to a search term can be available at auction, wherein the search term is associated with low demand (e.g., infrequent use, a topic not directly associated with a product/service, . . . ). Accordingly, if advertising space associated with the search term were auctioned, there may only be a single bidder that can obtain the advertising space at an extremely low price. If, however, the search term is auctioned against other related but non-identical search terms, then a higher price can be obtained for the advertising space. Thus, search terms within the set of search terms that includes the at-issue search term are treated as identical to the at-issue search term with respect to received bids. At 708, a dynamic reserve price is determined based at least in part upon the simulated auction. For instance, the dynamic reserve price can be a price that a defined fraction of bidders bid at or above. Thereafter, if a bid for the at-issue search term does not exceed the determined price, an advertisement relating to the prospective purchaser is not displayed. In contrast, if the prospective purchaser bids above the determined price, then an advertisement relating to such purchaser can be displayed upon a page view associated with the search term.

Now turning to FIG. 8, a methodology for dynamically setting reserve prices with respect to low demand search terms is illustrated. At 802, a search term associated with low demand and/or lack of data is received, for example, by a search engine. At 804, a set of non-identical search terms that are grouped with the received search term is located, and at 806 bids are solicited for the received search term as well as for other search terms within the set of search terms. For instance, prospective purchasers of advertising space can be made to believe that search terms within the set of search terms have been received by a search engine, and the prospective purchasers can provide bids for such terms. At 808, the bids can be utilized as if they were directed towards a single search term. At 810, prices for the received search term (and search terms within the set of search terms) are determined based at least in part upon the received bids. For instance, an average amount associated with received bids can be utilized as a reserve price. Any suitable manner of utilizing the received bids, however, is contemplated.

Now turning to FIG. 9, a methodology 900 for determining a manner by which to sell advertising space associated with a search term is illustrated. At 902, a set of related but non-identical search terms is received. At 904, a determination is made regarding whether sufficient demand and/or sufficient data exists with respect to each of the non-identical search terms within the set of search terms. For instance, usage data, purchasing data with respect to advertisers, and the like can be monitored and analyzed to determine demand associated with each of the search terms within the set of search terms. At decision block 906, if insufficient data is associated with a search term, then pricing information associated for the search term is determined by way of a simulated auction at 908 (as described in detail above). If, at decision block 906, it is found that sufficient data and/or demand is associated with a search term, then such search term should be subject to conventional auctions (without reserve pricing) and is removed from the set of non-identical search terms at 910.

Figure 10:
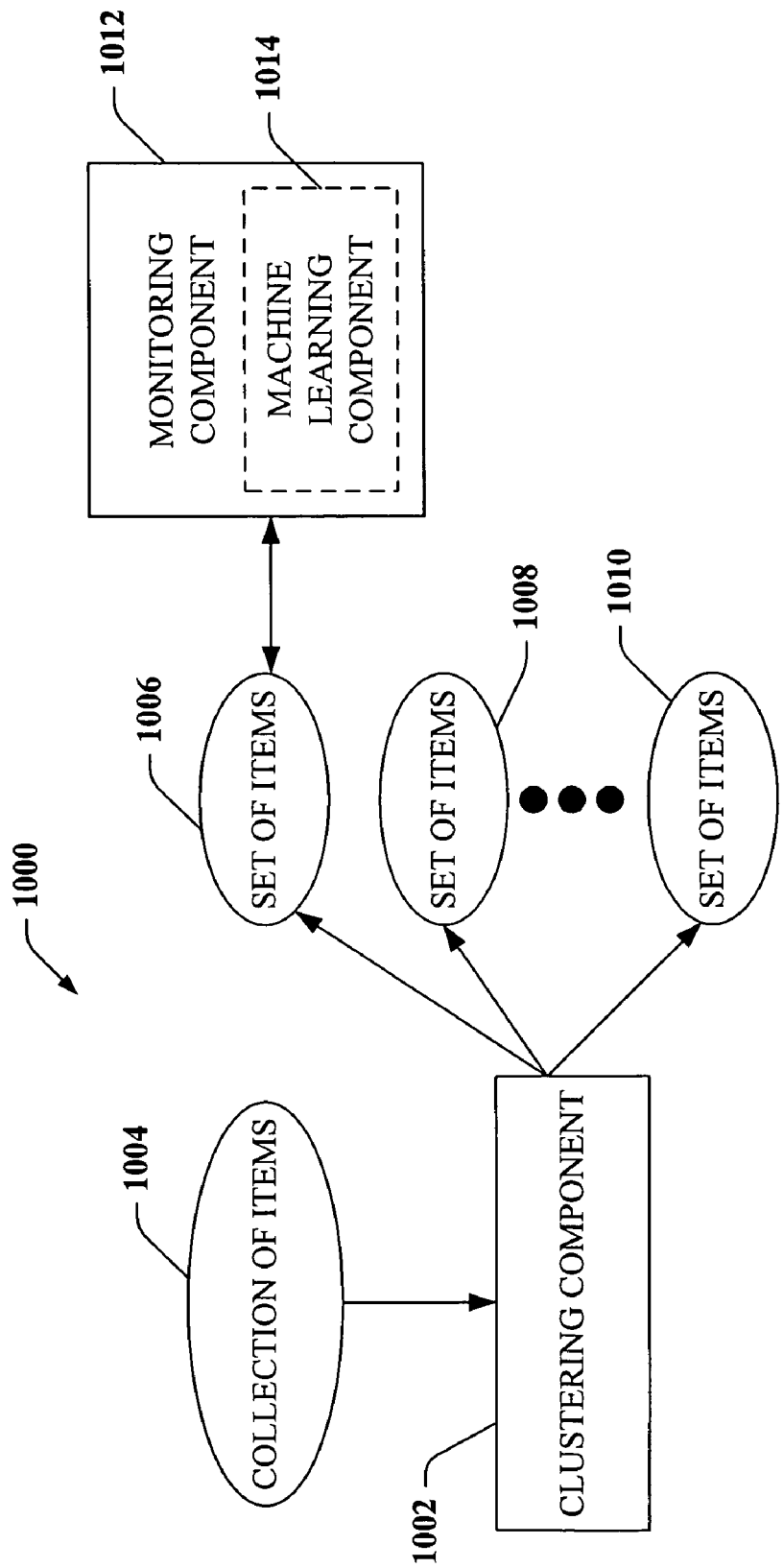
FIG. 10 is a representative flow diagram illustrating a methodology for monitoring prices associated with a set of low demand items and altering the prices based at least in part upon the monitoring.

Now referring to FIG. 10, a system 1000 that facilitates determining pricing information associated with low-demand items that are subject to auction is illustrated. The system 1000 includes a clustering component 1002 that receives a collection of low demand items 1004. For instance, the items within the collection of items can be search terms utilized by a search engine (e.g., advertising space associated with page views relating to a search term). The clustering component 1002 can cluster the collection of items 1004 into one or more sets of items 1006-1010, wherein the sets of items 1006-1010 each include related but non-identical items. For instance, pricing information can be set with respect to the set of items 1006-1010 without performing the simulated auction described herein. Rather, for example, the pricing information can be determined based upon experimentation. For instance, the pricing information can be set with respect to the set of items 1006 based upon a previous bid for one of the items within the set of items 1006.

A monitoring component 1012 can then monitor bidding activity with respect to the set of items 1006 and alter pricing information associated therewith. For instance, over time, the monitoring component 1012 can determine that a collective demand for the set of items 1012 has changed, and can then alter pricing information associated with the set of items 1006 based at least in part upon this determination. Furthermore, the monitoring component 1012 can include a machine learning component 1014 that can make inferences relating to pricing information of the sets of items 1006-1010. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

For a particular example, bidding with respect to items within the set of items can be monitored over time by the monitoring component 1012 and the machine learning component 1014. The machine learning component 1014 can notice trends in bidding with respect to items within the set of items, and can alter pricing information in accordance with the trends. Similarly, the monitoring component 1012 can monitor bidding activity of items outside the set of items 1006, and the machine learning component 1014 can alter pricing information associated with the set of items 1006 based upon such monitoring. For instance, prices for advertising space on search engines may drop for a majority of search terms—accordingly, it can be inferred that demand for the search terms in the set of items 1006 may also drop. The machine learning component 1014 can make such inference and cause pricing information associated with the set of items 1006 (and/or sets of items 1008-1010) to alter.

Figure 11:
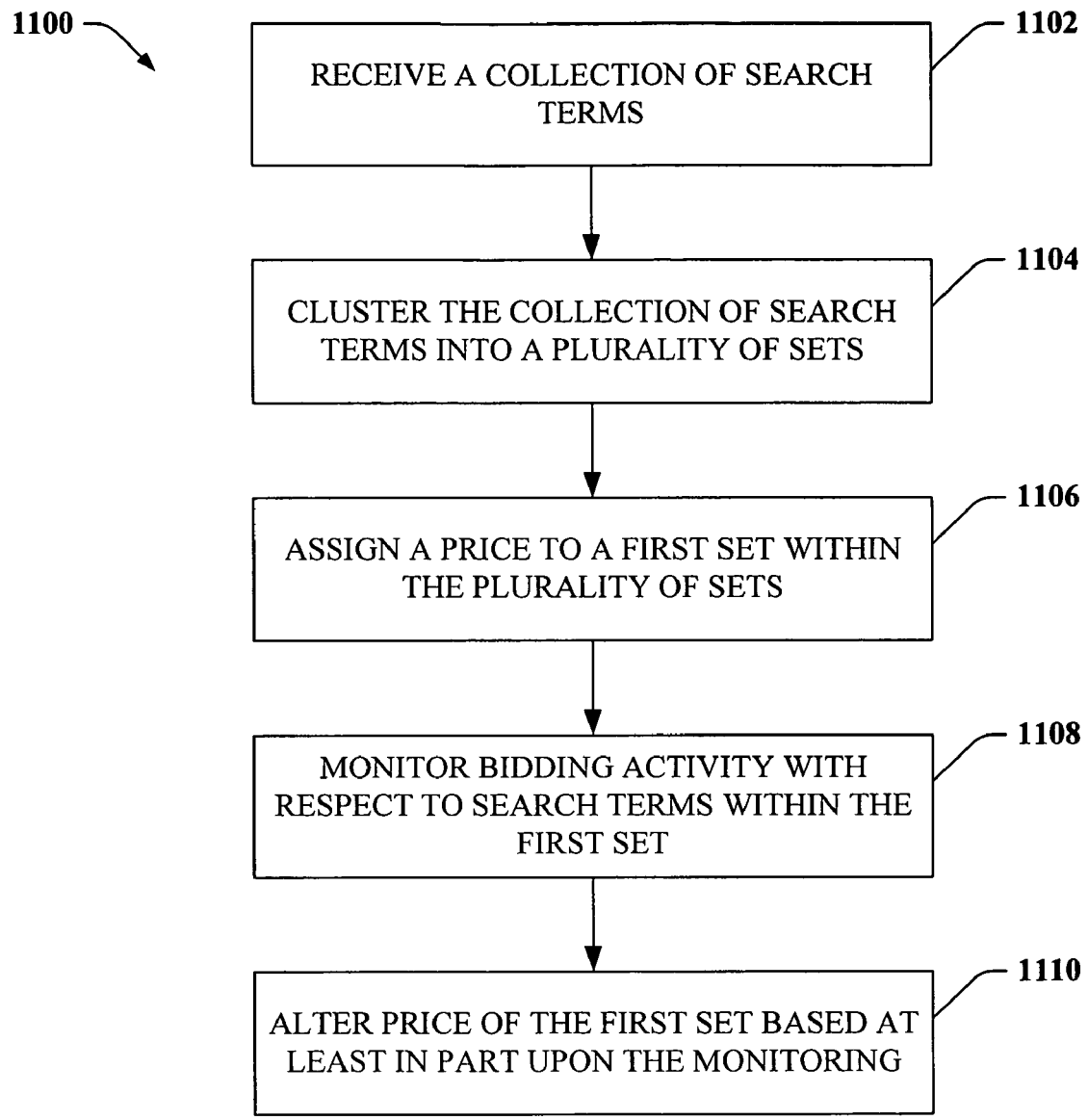
FIG. 11 is a representative flow diagram illustrating a methodology for altering pricing information associated with a set of low demand items.

Turning now to FIG. 11, a methodology for altering pricing information associated with a set of low demand items is illustrated. At 1102, a collection of non-identical search terms is received, and at 1104 such collection is clustered into a plurality of sets of related but non-identical search terms. At 1106, a price is assigned with respect to at least a first set of items within plurality of sets of items. For instance, such price can be assigned by way of analysis of empirical data. At 1108, bidding and purchasing activity relating to search terms within the set of search terms can be monitored, and at 1110 pricing information associated with the first set of search terms is altered based at least in part upon the monitoring. For instance, expert systems, Bayesian models, boosting classifiers, combinations of classifiers, support vector machines, and the like can be utilized to monitor bidding and purchasing activity and alter pricing information based at least in part thereon.

Figure 12:
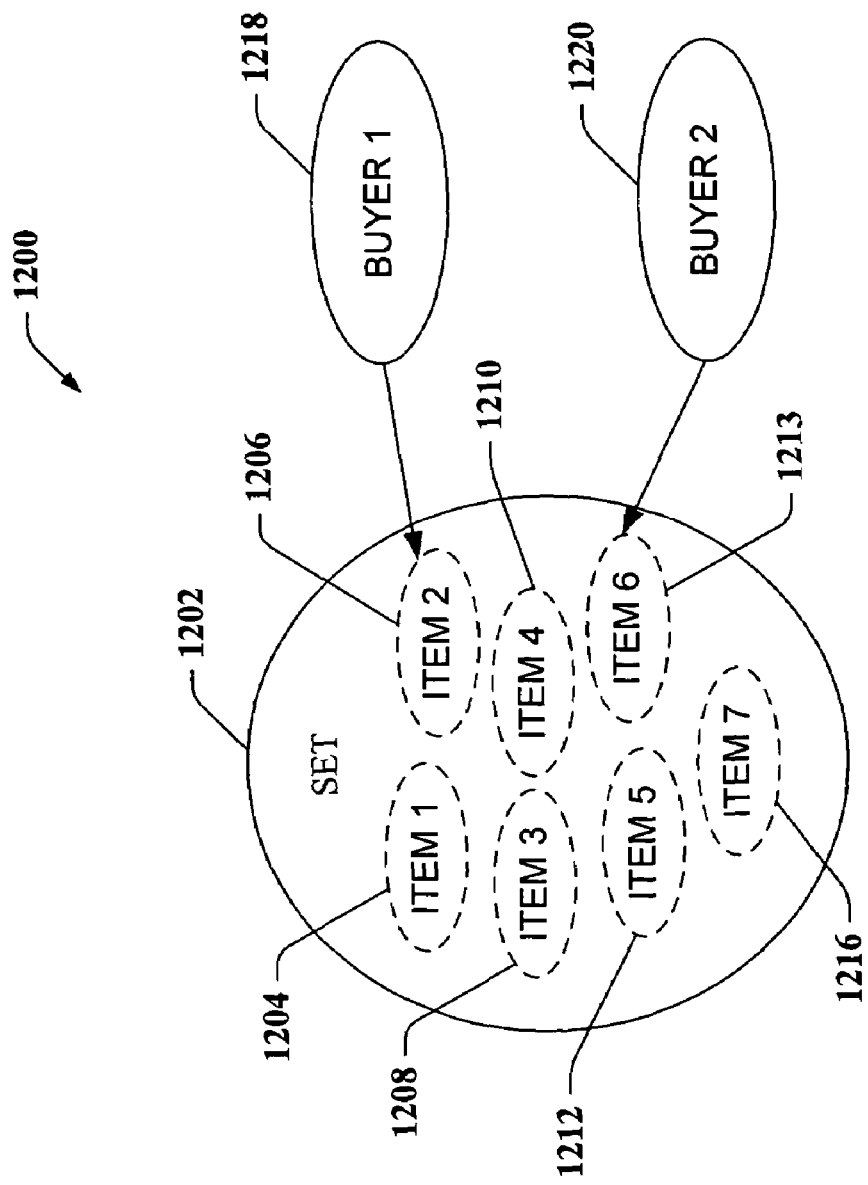
FIG. 12 illustrates a manner in which bids provided by disparate buyers on different items can be treated as though they were directed to the same item.

Now referring to FIG. 12, an exemplary system 1200 is illustrated. A set of items 1202 includes a plurality of items 1204-1216, where the items 1204-1216 are in some way related but non-identical. The items 1204-1216 can be placed within the set 1202, for example, by way of clustering. Further, at least one of the items 1204-1216 is available for purchase by way of an auction—however, it can seem to prospective buyers that each of the items 1204-1216 is available for purchase by way of auction. For instance, the item 1206 can be available for purchase by way of auction.

Furthering this example, a first buyer 1218 wishes to bid upon the item 1206, and the first buyer 1218 is the only bidder with respect to the item 1206. Conventionally, the first buyer 1218 would receive the item 1206 with a low bid, as there is no competition with respect to the item 1206. Thus, the items 1204-1218 can be treated as identical items. For instance, a second buyer 1220 can place a bid against the item 1214, and to the first buyer 1218 it seems as if the second buyer is bidding on the item 1206. Thus, the buyers 1218 and 1220 can be pitted against one another, even though such buyers 1218 and 1220 are bidding on disparate items. This simulated auction technique provides for greater revenue for a seller, as the buyers 1218-1220 will enter bids that more accurately reflect a value that they place upon a desired item. Furthermore, this example can be extended to include a greater number of items and a greater number of buyers. If a substantial number of bids is received with respect to disparate items within a set of items, a reserve price can be dynamically determined based upon such bids.

Figure 13:
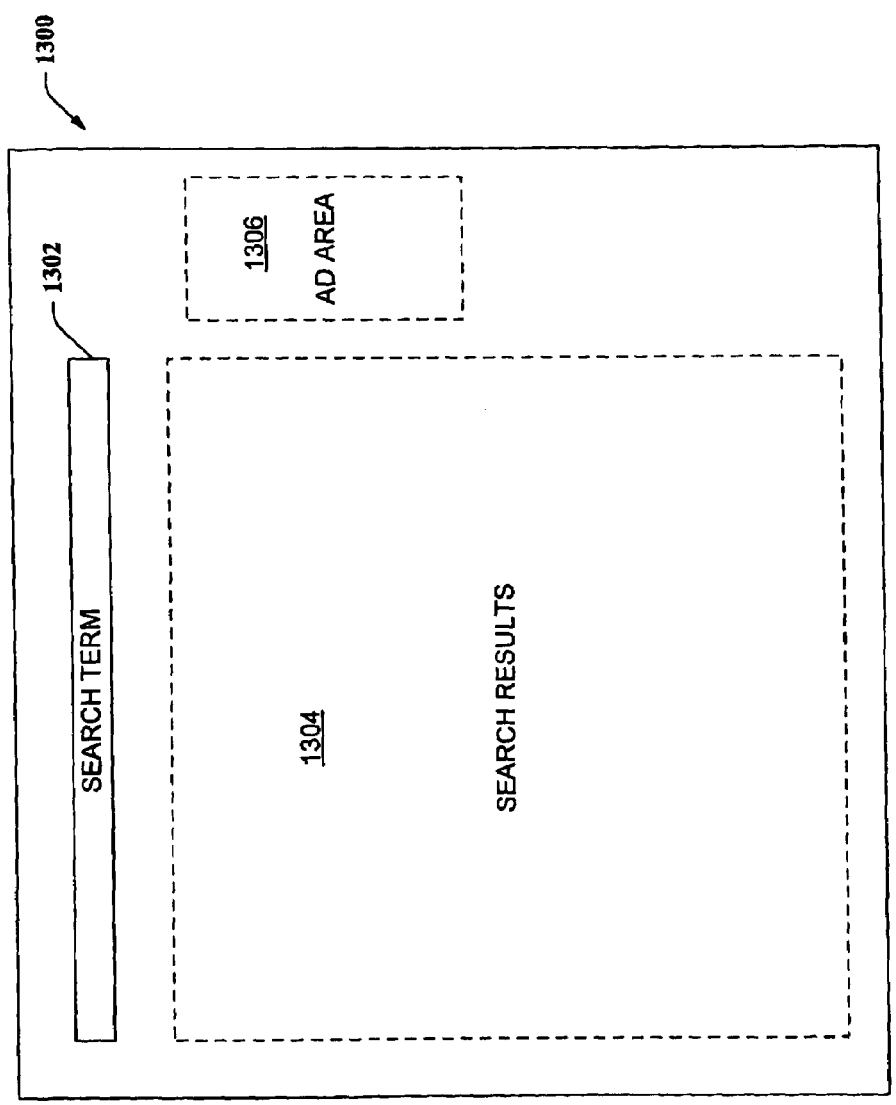
FIG. 13 is an exemplary page view that can include an advertisement.

Turning now to FIG. 13, an exemplary page view 1300 associated with a search engine that can display advertisements is illustrated. The page view 1300 includes a search field 1302 that can receive one or more search terms. For instance, the received search term(s) can be associated with relatively low demand. Advertising space associated with the search term can be sold, wherein a reserve price can be dynamically determined based at least in part upon a simulated auction. The page view 1300 can further include a search results area 1304 that displays search results associated with a search term entered into the search field 1302. Furthermore, the page view 1300 can include an advertisement area 1306 that will display an advertisement if a bid is entered that lies above the dynamically determined reserve price. Thus, upon a user providing a search query to a search engine, an advertiser will be provided an opportunity to purchase advertising space associated with the search query, and if a sufficient price is paid an advertisement associated with the advertiser will be displayed upon the page view 1300.

Figure 14:
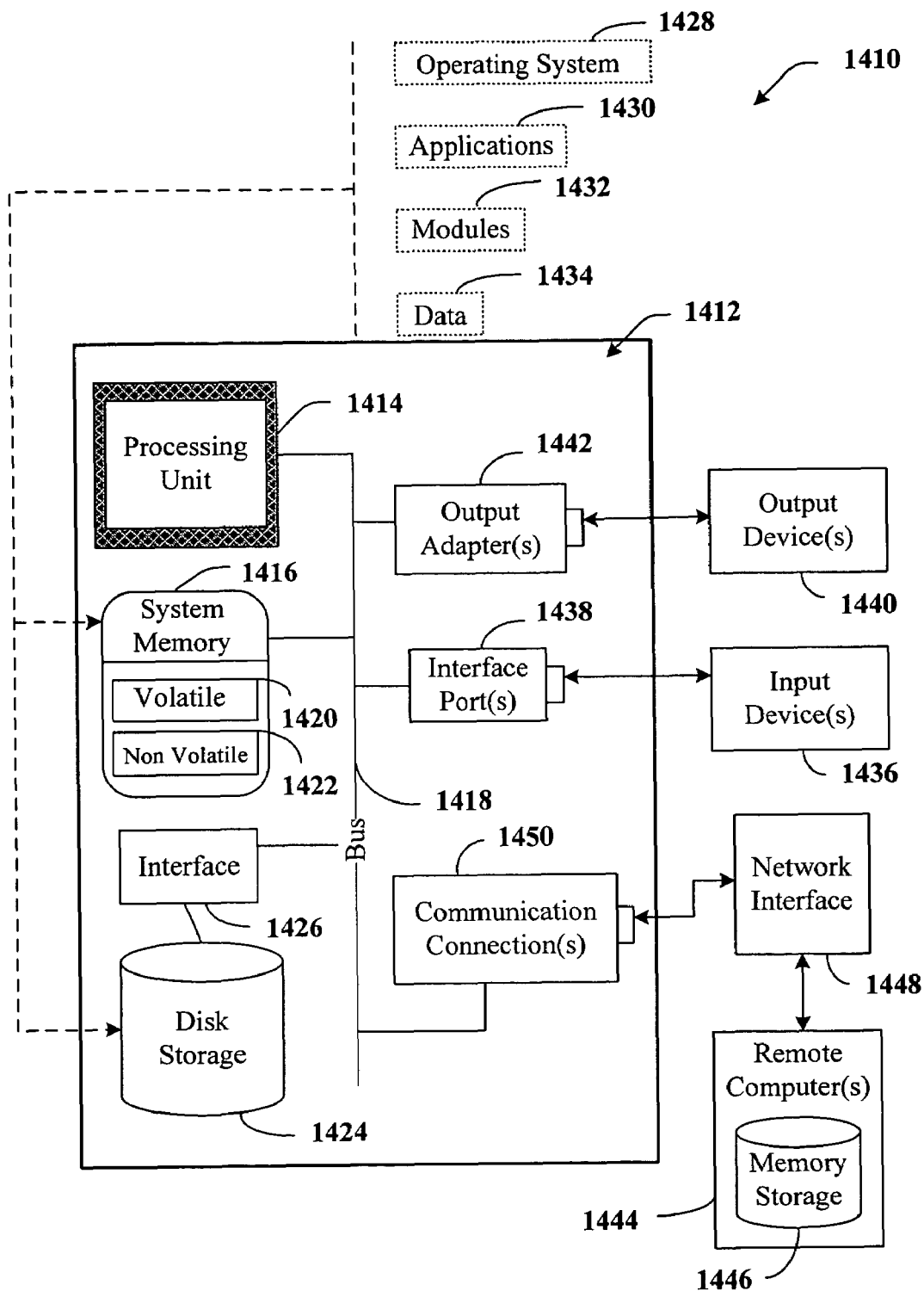
FIG. 14 is a schematic block diagram illustrating a suitable operating environment.

In order to provide additional context for various aspects of the claimed subject matter, FIG. 14 and the following discussion are intended to provide a brief, general description of a suitable operating environment 1410 in which various aspects described herein may be implemented. While the claimed subject matter is described in the general context of computer-executable instructions, such as program modules, executed by one or more computers or other devices, those skilled in the art will recognize that aspects described herein can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the claimed subject matter. Other well known computer systems, environments, and/or configurations that may be suitable for use with aspects described herein include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various claimed aspects includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
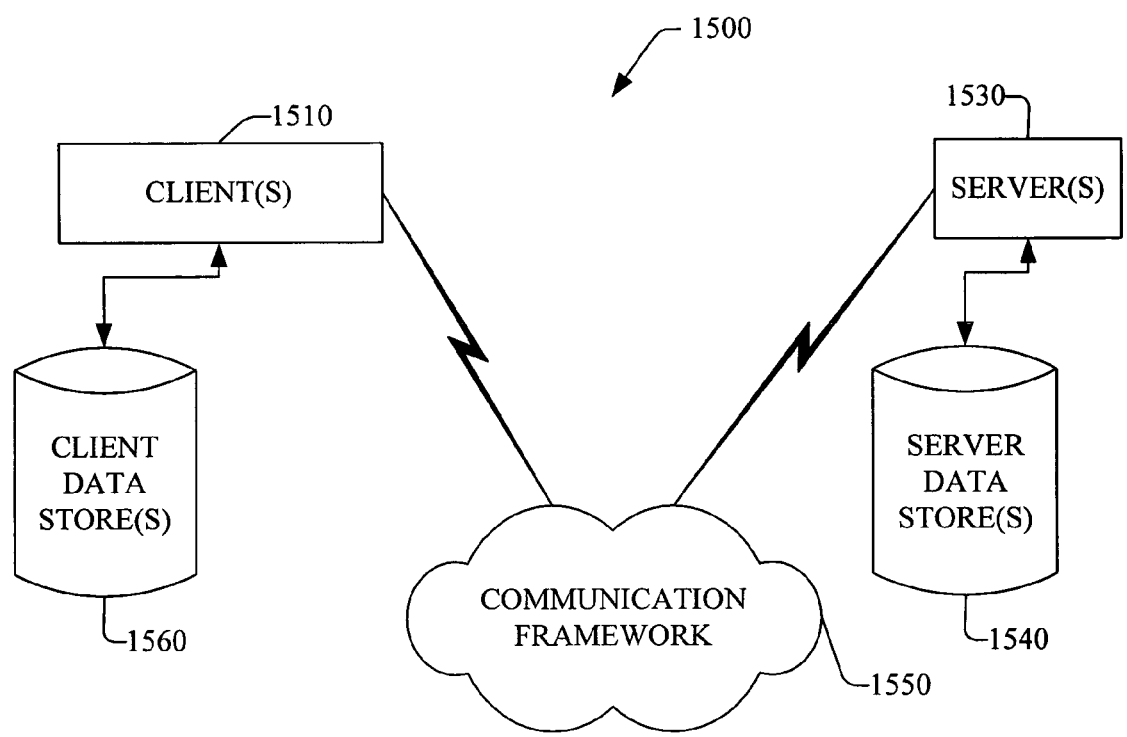
FIG. 15 is a schematic block diagram of a sample-computing environment.

FIG. 15 is a schematic block diagram of a sample-computing environment 1500 with which the claimed subject matter can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the claimed subject matter. It is, of course, not possible to describe every conceivable combination of components or methodologies for purposes of describing such claimed matter, but one of ordinary skill in the art may recognize that many further combinations and permutations are possible. Accordingly, features described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates establishing prices associated with items, comprising:
   a clustering component that clusters a collection of non-identical items into one or more sets of non-identical items such that the collection of non-identical items are created to require a minimum number of bids will be received by the system for each collection of non-identical items;
   a pricing component that receives one or more of active bids and stored bids and simulates an auction of at least one non-identical item within a selected set of non-identical items as if the non-identical items within the selected set were identical to determine price(s) associated with the at least one non-identical item; and
   a price transformation component that scales the determined price in accordance with a user-specified payment plan, the determined price relating to the price for displaying an advertisement on a page view, and the scaled prices relate to one of a number of clicks received upon the advertisement, a number of secured clicks received upon the advertisement, and a number of purchases made by way of the advertisement.

2. The system of claim 1, the pricing component determines that the non-identical items include a search term received by a search engine and sets prices associated with advertising space resulting from utilization of the search term in connection with the search engine.

3. The system of claim 2, wherein a page view resulting from utilization of the search term in connection with the search engine includes an advertisement of a bidder that provides a bid above the determined price.

4. The system of claim 1, further comprising a logging component that logs a search term received by a search engine, the search term is included within the collection of non-identical items.

5. The system of claim 1, wherein the clustering component clusters the collection of non-identical items into a plurality of disparate sets of non-identical items.

6. The system of claim 1, further comprising a scaling component that scales a bid associated with an item within the one or more sets of non-identical items based at least in part upon an estimated demand associated with the item.

7. The system of claim 1, further comprising a calculating component that generates an estimate of demand associated with an item within the collection of items, the item purged from the collection of items if the estimate of demand is above a threshold.

8. The system of claim 1, further comprising an interface component that accepts a search query from a user, the search query includes at least one search term that is within the one or more sets of non-identical items.

9. The system of claim 1, further comprising a display component that displays an advertisement associated with a purchaser that bids above the determined price(s).

10. The system of claim 1, wherein the pricing component assigns a substantially similar price to each item within the selected set.

11. The system of claim 1, wherein the pricing component analyzes the received bids to set the price(s) for all items within the selected set.

12. The system of claim 1, wherein a portable computing device comprises the clustering component and the pricing component.

13. The system of claim 1, further comprising:
   an analysis component that monitors bidding activity of a prospective purchaser with respect to at least one of the items within the one or more sets; and
   a probability generator component that calculates a probability that the prospective purchaser is undertaking activities adverse to a free market and rejects a bid associated with the prospective purchaser if the probability exceeds a defined threshold.

14. A computer-implemented system that facilitates establishing prices associated with items, comprising:
   a clustering component that clusters a collection of non-identical items into a plurality of disparate sets of non-identical items;
   a pricing component that receives one or more of active bids and stored bids and simulates an auction of at least one non-identical item within a selected set of non-identical items as if the non-identical items within the selected set were identical to determine the price associated with the at least one non-identical item;

a calculating component that generates an estimate of demand associated with an item within the collection of non-identical items, the item purged from the collection of items if the estimate of demand is above a threshold;

a scaling component that scales a bid of the one or more of active bids and stored bids and that is associated with an item within the plurality of disparate sets of non-identical items based at least in part upon the estimate of demand associated with the item; and a display component that displays an advertisement associated with a purchaser that bids above the determined price.

* * * * *